(12) United States Patent
Kuo

(10) Patent No.: US 8,319,804 B2
(45) Date of Patent: Nov. 27, 2012

(54) ELECTRONIC DEVICES WITH AUTOMATIC BRIGHTNESS ADJUSTMENT AND THE METHOD THEREOF

(75) Inventor: Jen-Kai Kuo, Tu-Cheng (TW)

(73) Assignee: Chi Mei Communication Systems, Inc., Tu-Cheng, New Taipei (TW)

(*) Notice: Subject to any disclaimer, the term of this patent is extended or adjusted under 35 U.S.C. 154(b) by 304 days.

(21) Appl. No.: 12/826,652

(22) Filed: Jun. 29, 2010

(65) Prior Publication Data

US 2011/0181541 A1 Jul. 28, 2011

(30) Foreign Application Priority Data

Jan. 28, 2010 (TW) .................................. 99102368

(51) Int. Cl.
*G09G 5/10* (2006.01)
(52) U.S. Cl. ........................ 345/690; 345/174

(58) Field of Classification Search .................. None
See application file for complete search history.

(56) References Cited

U.S. PATENT DOCUMENTS

2011/0080421 A1* 4/2011 Capener ........................ 345/589
* cited by examiner

*Primary Examiner* — Wayne Young
*Assistant Examiner* — Brian Butcher
(74) *Attorney, Agent, or Firm* — Altis Law Group, Inc.

(57) ABSTRACT

A electronic device and method regulates a display brightness of the electronic device. The electronic device can create relationships between the external environment brightness of the electronic device and the brightness of the display of the electronic device. Furthermore, the electronic device can regulate the brightness of the display, according to user's expression due to the former regulation. The operations of creating relationships and regulating the brightness can be expediently implemented, and faults of the operations can be avoided, by utilizing the electronic device.

15 Claims, 2 Drawing Sheets

ELECTRONIC DEVICES WITH AUTOMATIC BRIGHTNESS ADJUSTMENT AND THE METHOD THEREOF

BACKGROUND

1. Technical Field

Embodiments of the present disclosure relates to brightness adjustment, and in particular, to an electronic device with automatic brightness and the method thereof.

2. Description of Related Art

Electronic devices, such as notebook computers, personal digital assistants, and cellular phones, include displays. Particularly, for mobile products, a user may potentially view the display in a broad range of environmental conditions. As the eyes adapt to the ambient luminance, a change in the environment may result in the display no longer being readable.

A common technique to improve readability is to provide the viewer with a manual control to adjust a brightness of the display. However, such manual adjustments are inadequate for mobile products as the mobile products may be moved frequently from place to place.

What is needed, therefore, is an automatic brightness adjustment device and method to overcome the aforementioned problem.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
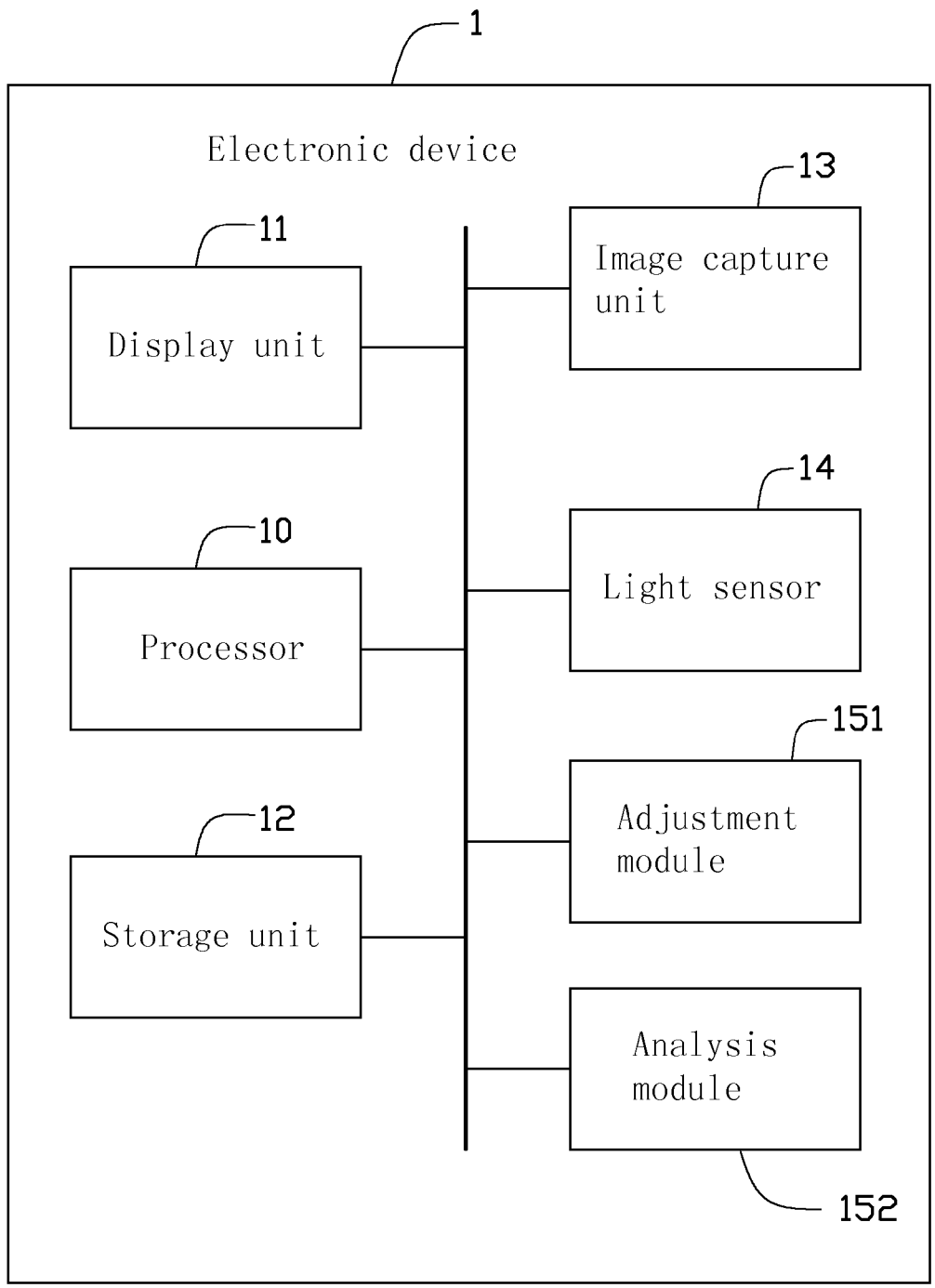
FIG. 1 is a block diagram of one embodiment of an electronic device having an automatic brightness adjustment feature.

FIG. 1 is a block diagram of one embodiment of an electronic device 1 having an automatic brightness adjustment feature. The electronic device 1 includes at least one processor 10, a display unit 11, a storage unit 12, an image capturing unit 13, a light sensor 14, an adjustment module 151 and an analysis module 152. In the embodiment, the electronic device 1 is a mobile phone. In other embodiments, the electronic device 1 may be a personal digital assistant (PDA), a handheld game console, a digital camera (DC) or a handheld computer.

The electronic device 1 is generally controlled and coordinated by an operating system software, such as the UNIX, Linux, Windows 95, 98, NT, 2000, XP, Vista, Mac OS X, an embedded operating system, or any other compatible operating systems. In other embodiments, the electronic device 1 may be controlled by a proprietary operating system. Conventional operating systems control and schedule computer processes for execution, perform memory management, provide file system, networking, and I/O services, and provide a user interface, such as a graphical user interface (GUI), among other things.

The processor 10 is operable to execute one or more computerized codes of the analysis module 152 and the adjustment module 151. The one or more computerized codes of the modules 151, 152 may be stored in the storage unit 12 and executed by the processor 10. The processor 10, as an example, may include a CPU, math coprocessor, or shift register.

The display unit 11 is a screen that can be used to automatically adjust brightness of the display unit 11. The display unit 11 is operable to display information on the screen. The display unit 11 may be a display screen, a resistive touch screen or a capacitive touch screen.

The storage unit 12 is electronically connected to the processor 10, the image capture unit 13, the light sensor 14, the adjustment module 151 and the analysis module 152. The storage unit 12 is operable to save data or information from the processor 10, the image capture unit 13, the light sensor 14, the adjustment module 151 or the analysis module 152. For example, the storage unit 12 saves some data of diameter range of the pupil calculated by the analysis module 152 in different condition, such as the diameter range of a opening pupil, a half opening pupil, and a closed pupil. The storage unit 12 may include a hard disk drive, flash memory, RAM, ROM, cache, or external storage mediums.

The image capture unit 13 is a camera lens module and operable to capture at least one image of a region of at least one pupil of an eye of a user, and to send the captured image to the analysis module 152. However, in such an example, if someone wears sun glasses, the image capture unit 13 further executes a deep color filter to process the captured pupil image before sending the captured image to the analysis module 152.

The light sensor 14 is operable to detect a variation of environmental light intensity surrounding the electronic device 1 and output the detected variation to the adjustment module 151. The light sensor 14 is configured in the front side of the display unit 11. By this design, the light sensor 14 is able to detect the variation of environmental light intensity in front of the electronic device 1 accurately.

The adjustment module 151 is operable to perform a brightness adjustment of the display unit 11 in response to a variation of environmental light intensity surrounding the electronic device 1 detected by the light sensor 14. In one embodiment, the adjustment module 151 controls the light sensor 14 to detect the variation of environmental light intensity surrounding the electronic device 1, then determines a corresponding range of the environmental brightness and determines a suitable brightness value of the display unit 11 from a corresponding table saved in the storage unit 12. The adjustment module 151 then determines whether the brightness of the display unit 11 is needed to be adjusted by comparing the suitable brightness value with a current brightness value of the display unit 11. For example, the light sensor 14 detects the environmental brightness value in front of the display unit 11 is 850 cd/m$^2$. Referring to the corresponding table saved in the storage unit 12, the adjustment module 151 determines the suitable brightness value of the display unit 11 is 600 cd/m$^2$. If the current brightness value of the display unit 11 is 500 cd/m². Then, the adjustment module 151 adjusts the brightness value of the display unit 11 from 500 cd/m² to 600 cd/m².

The adjustment module 151 is further operable to perform a brightness adjustment of the display unit 11 in response to a detected difference of the diameter of at least one pupil from the analysis module 152. The adjustment module 151 also provides a user interface to predefine a threshold value of the brightness adjustment of the display unit 11. The threshold value is for the purpose of preventing a higher brightness from hurting the eyes of the user. In one embodiment, the user predefines the threshold value of the brightness adjustment of the display unit 11 with automatic brightness. For example, the threshold value is predefined as 600 cd/m² and is saved to the storage unit 12. Then, if the adjustment module 151 performs a brightness adjustment of the display unit 11 to 650 cd/m² in response to a detected difference of the diameter of at least one pupil from the analysis module 152. Because of limit of the threshold value 600 cd/m², the adjustment module 151 finally performs a brightness adjustment of the display unit 11 to 600 cd/m² instead of 650 cd/m².

The analysis module 152 is operable to receive the captured images from the image capture unit 13 and to detect whether a diameter of the one pupil from the captured image is different to a saved data in the storage unit. In one embodiment, the processor 10 executes the image capture unit 13 to capture images on at least one pupil of a user. The analysis module 152 detects a face zone from the captured images. Specifically, the detection of the face zone is accomplished by a skin-color algorithm. That is, the face zone is defined according to a range of skin colors of the user's face. The range of the skin color is disclosed can, in one embodiment, be defined by the following equation:

$$Skin_{color}(x, y) = \begin{cases} 1, & \text{if } [Cr(x, y) \in Skin_{Cr}] \cap [Cb(x, y) \in Skin_{Cb}] \\ 0, & \text{otherwise} \end{cases}$$

where, if the value of $Skin_{color}(x, y)$ is 1, the detected range of the face color is determined as the skin color. The analysis module 152 then sets the color of the detected range as white. If the value of $Skin_{color}(x, y)$ is not 1, the detected range of the face color is determined as being a non-skin color. The analysis module 152 then sets the color of the detected range as black. After defining the face zone, the analysis module 152 defines a face-rectangular representative of a maximal element of the face zone. The face rectangular is formed by determined points which locates the extreme right side, extreme left side, extreme upper and the extreme downside by the analysis module 152. The face rectangular is a sampling space of characteristics within the face zone which is defined by the analysis module 152 according to the characteristics within the face zone.

The analysis module 152 is further operable to locate an eye area (area of an eye of the user) from the defined face zone. Firstly, the analysis module 152 locates a rough eye area by detecting two circle shapes having deeper color than a neighborhood from the defined face zone. After detecting the rough eye area, the analysis module 152 utilizes an algorithm, such as the Sobel algorithm to enhance the border of the eye area and further blacken the eye area. The eye area is then processed by a binarization process. Herein, the binarization process is an image binarizing algorithm based on a mathematical morphology.

After performing the binarization process, the analysis module 152 samples the border of the eye area so as to obtain an outline of the eye area by an algorithm, such as the Snake algorithm. Repeat the above process, the analysis module 152 further samples the region of one pupil from the eye area. In addition, the analysis module 152 further calculates a diameter of the pupil and saves the calculated diameter value to the storage unit 12.

Furthermore, the analysis module 152 calculates the diameter of the pupil when detecting that the adjustment module 151 is adjusting the brightness of the display unit 11. The analysis module 152 receives a captured image from the image capture unit 13 and calculates the diameter of the pupil, then saves the diameter value to the storage unit 12. In one embodiment, if the diameter value calculated by the analysis module 152 is different from the prior calculated value saved in the storage unit 12, the analysis module 152 will send a adjustment signal to the adjustment module 151 to adjust the brightness of the display unit 11. For example, if the diameter value of the pupil calculated by the analysis module 152 is larger than the prior calculated value saved in the storage unit 12, the analysis module 152 sends a adjustment signal to the adjustment module 151 to adjust to a lower brightness of the display unit 11. Otherwise, the analysis module 152 sends the adjustment signal to the adjustment module 151 to adjust to a higher brightness of the display unit 11.

Figure 2:
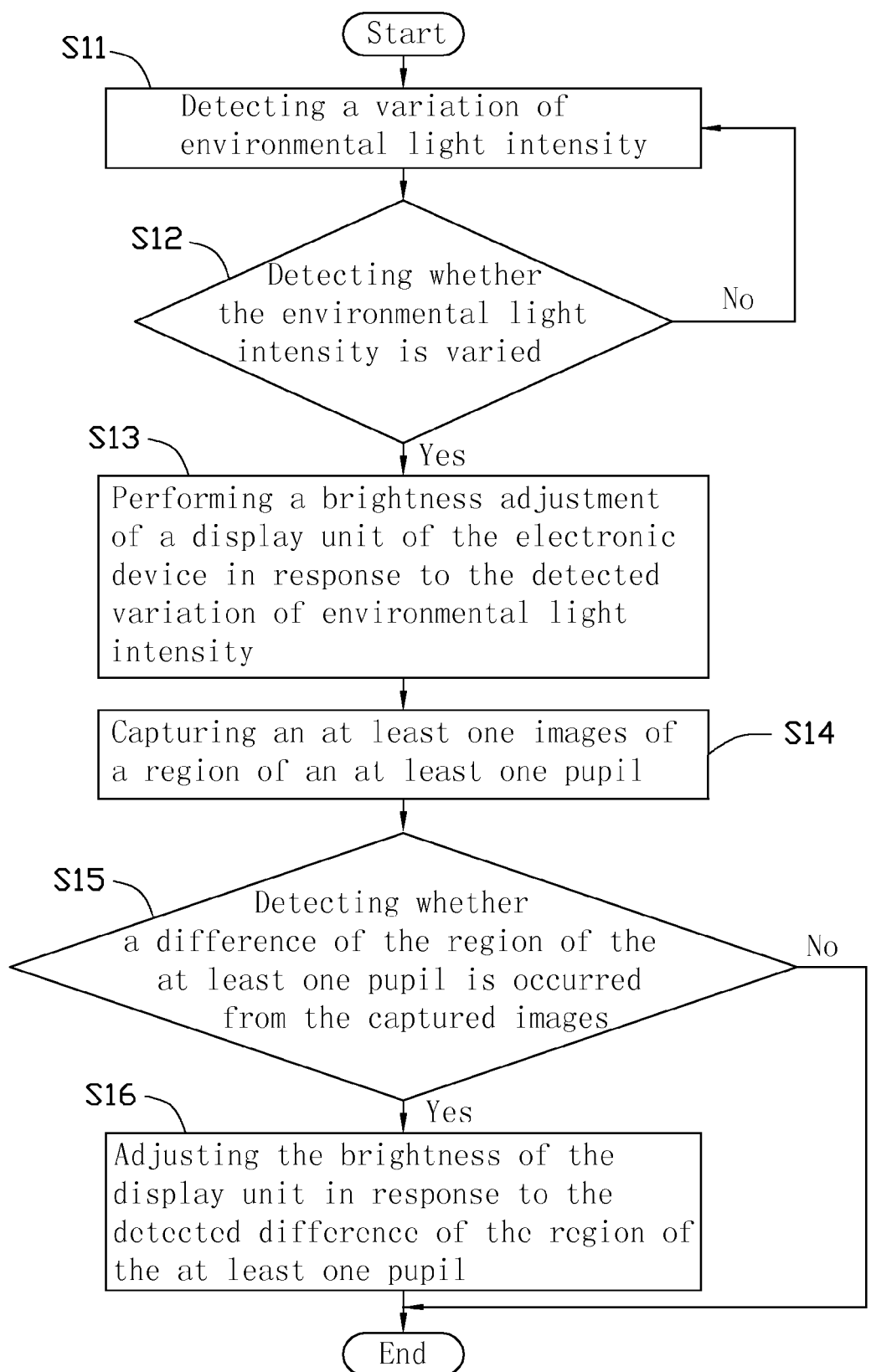
FIG. 2 is a flowchart of one embodiment of a method for automatically adjusting a brightness of an electronic device.

FIG. 2 is a flowchart of one embodiment of a method for automatically adjusting a brightness of the electronic device of FIG. 1. Depending on the embodiment, additional blocks may be added, others removed, and the ordering of the blocks may be changed.

In block S11, the light sensor 14 detects a variation of environmental light intensity surrounding the electronic device 1 and outputs a plurality of brightness values to the adjustment module 151.

In block S12, the adjustment module 151 detects whether the environmental light intensity is varied. If varied, block S13 is implemented. If not, block S11 is implemented.

In block S13, the adjustment module 151 performs a brightness adjustment of the display unit 11 in response to the detected variation of environmental light intensity.

In block S14, the image capture unit 13 captures at least one image of a region of at least one pupil of an eye of a user of the electronic device 1 and sends the captured image to the analysis module 152.

In block S15, the analysis module 152 detects whether a diameter of the at least one pupil from the captured image is different to a prior calculated value saved in the storage unit 12. If so, block S16 is implemented. If not, the procedure is ended.

In block S16, the adjustment module 151 adjusts the brightness of the display unit 11 according to the detected difference of the diameter of at least one pupil.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be comprised herein within the scope of this disclosure and the above-described inventive embodiments, and the present disclosure is protected by the following claims.

What is claimed is:

1. An electronic device with an automatic brightness adjustment feature, the device comprising:
   a display unit;
   a storage unit;

a light sensor to detect variation of environmental light intensity surrounding the electronic device;

an image capture unit to capture at least one image of a region of at least one pupil of an eye of a user positioned in front of the electronic device, and execute a deep color filter to process the captured image when the user wears sun glasses;

an analysis module to detect the region of the pupil from the captured image by performing a skin-color algorithm, and detect whether a diameter of the pupil from the captured image is different compared to a prior calculated diameter of the pupil saved in the storage unit;

an adjustment module to adjust brightness of the display unit in response to the detected variation of environmental light intensity and the detected difference of diameter of the at least one pupil; and at least one processor to execute the analysis module and the adjustment module.

2. The device as claimed in claim 1, wherein the display unit is a resistive touch screen or a capacitive touch screen.

3. The device as claimed in claim 1, wherein the adjustment module further provides a user interface for the user to predefine a threshold value of the brightness adjustment.

4. The device as claimed in claim 3, wherein the brightness adjustment is appropriate if the detected difference is smaller than a predefined threshold.

5. The device as claimed in claim 3, wherein the adjustment module is further operable to adjust brightness of the display unit if the brightness adjustment is not appropriate.

6. A method for automatically adjusting a brightness of an electronic device, the method comprising:

detecting a variation of environmental light intensity;

performing a brightness adjustment of a display unit of the electronic device in response to the detected variation of environmental light intensity;

capturing at least one image of a region of at least one pupil of an eye of a user positioned in front of the electronic device using an image capture unit of the electronic device;

executing a deep color filter to process the captured image when the user wears sun glasses;

detecting the region of the pupil from the captured image by performing a skin-color algorithm;

detecting whether a diameter of the pupil from the captured image is different compared to a prior calculated diameter of the pupil saved in a storage unit of the electronic device; and adjusting brightness of the display unit in response to the detected difference of diameter of the at least one pupil.

7. The method as claimed in claim 6, wherein the display unit is a resistive touch screen or a capacitive touch screen.

8. The method as claimed in claim 6, further comprising:
providing a user interface for the user to predefine a threshold value of the brightness adjustment.

9. The method as claimed in claim 8, wherein the brightness adjustment is appropriate if the detected difference is smaller than a predefined threshold.

10. The method as claimed in claim 8, further comprising:
adjusting the brightness of the display unit if the brightness adjustment is not appropriate.

11. A non-transitory storage medium having stored thereon instructions that, when executed by a processor, causes the processor to perform a method for automatically adjusting a brightness of an electronic device, the method comprising:

detecting a variation of environmental light intensity;

performing a brightness adjustment of a display unit of the electronic device in response to the detected variation of environmental light intensity;

capturing at least one image of a region of at least one pupil of an eye of a user positioned in front of the electronic device using an image capture unit of the electronic device;

executing a deep color filter to process the captured image when the user wears sun glasses;

detecting the region of the pupil from the captured image by performing a skin-color algorithm;

detecting whether a diameter of the pupil from the captured image is different compared to a prior calculated diameter of the pupil saved in a storage unit of the electronic device; and adjusting brightness of the display unit in response to the detected difference of diameter of the at least one pupil.

12. The non-transitory storage medium of claim 11, wherein the display unit is a resistive touch screen or a capacitive touch screen.

13. The non-transitory storage medium of claim 11, wherein the method further comprising:
providing a user interface for the user to predefine a threshold value of the brightness adjustment.

14. The non-transitory storage medium of claim 13, wherein the brightness adjustment is appropriate if the detected difference is smaller than a predefined threshold.

15. The non-transitory storage medium of claim 13, wherein the method further comprising:
adjusting the brightness of the display unit if the brightness adjustment is not appropriate.

* * * * *